United States Patent
Kowalewski

(10) Patent No.: US 8,861,509 B2
(45) Date of Patent: Oct. 14, 2014

(54) COMMUNICATION DEVICES AND METHODS FOR GENERATING A MESSAGE

(75) Inventor: Frank Kowalewski, Goettingen (DE)

(73) Assignee: Intel Mobile Communications GmbH, Neubiberg (DE)

(*) Notice: Subject to any disclaimer, the term of this patent is extended or adjusted under 35 U.S.C. 154(b) by 233 days.

(21) Appl. No.: 13/169,176

(22) Filed: Jun. 27, 2011

(65) Prior Publication Data
US 2012/0329487 A1 Dec. 27, 2012

(51) Int. Cl.
*H04L 12/66* (2006.01)
*H04L 12/58* (2006.01)
*H04L 29/06* (2006.01)
*H04W 4/14* (2009.01)

(52) U.S. Cl.
CPC .............. *H04L 51/066* (2013.01); *H04L 51/38* (2013.01); *H04L 69/08* (2013.01); *H04W 4/14* (2013.01)
USPC ............................ 370/352; 370/389; 370/310

(58) Field of Classification Search
USPC ......... 370/331, 352, 389; 709/227; 455/550.1
See application file for complete search history.

(56) References Cited

U.S. PATENT DOCUMENTS

| | | | |
|---|---|---|---|
| 7,650,415 B1* | 1/2010 | Peterson ....................... | 709/227 |
| 2004/0214586 A1* | 10/2004 | Loganathan et al. ....... | 455/456.2 |
| 2007/0076751 A1* | 4/2007 | Garcia-Martin et al. ..... | 370/466 |
| 2007/0078935 A1* | 4/2007 | Garcia-Martin et al. ..... | 709/206 |
| 2009/0323636 A1* | 12/2009 | Dillon et al. ................... | 370/331 |
| 2010/0074154 A1* | 3/2010 | Astrom et al. ................. | 370/310 |
| 2011/0103372 A1* | 5/2011 | Shatsky et al. ................ | 370/352 |
| 2011/0103373 A1* | 5/2011 | Shatsky et al. ................ | 370/352 |
| 2011/0202661 A1* | 8/2011 | Sener ............................ | 709/227 |
| 2012/0155459 A1* | 6/2012 | Bouthemy .................... | 370/389 |

OTHER PUBLICATIONS

3GPP TS 22.090 V9.0.0 (Dec. 2009) 3rd Generation Partnership Project; Technical Specification Group Services and System Aspects; Unstructured Supplementary Service Data (USSD)—Stage 1 (Release 9) pp. 1-10.
3GPP TS 24.080 V9.2.0 (Jun. 2010) 3rd Generation Partnership Project; Technical Specification Group Core Network and Terminals; Mobile radio interface layer 3 supplementary services specification; Formats and coding (Release 9); pp. 1-44.
3GPP TS 24.090 V10.0.0 (Mar. 2011) 3rd Generation Partnership Project; Technical Specificiation Group Core Network and Terminals; Unstructured Supplementary Service Data (USSD); Stage 3 (Release 10); pp. 1-13.
Network Working Group Request for Comments: 3261 "SIP: Session Initiation Protocol" J. Rosenberg et al. pp. 1-270, Jun. 2002.
Network Working Group Request for Comments: 4975 "The Message Session Relay Protocol (MSRP)" Campbell et al. pp. 1-64, Sep. 2007.
International Search Report and Written Opinion in related PCT Application No. PCT/EP2012/061721, mailed Nov. 11, 2012.

* cited by examiner

*Primary Examiner* — Nathan Taylor
(74) *Attorney, Agent, or Firm* — Schwabe, Williamson & Wyatt, P.C.

(57) ABSTRACT

According to one embodiment, a communication device is described that comprises a determining circuit configured to determine a type of an information indicated by a first message, wherein the first message is formed in accordance with a first transmission protocol; a selecting circuit configured to select a type of message according to a second transmission protocol based on the determined type of information; and a message generating circuit configured to generate a second message of the selected type according to the second transmission protocol indicating the information.

19 Claims, 10 Drawing Sheets

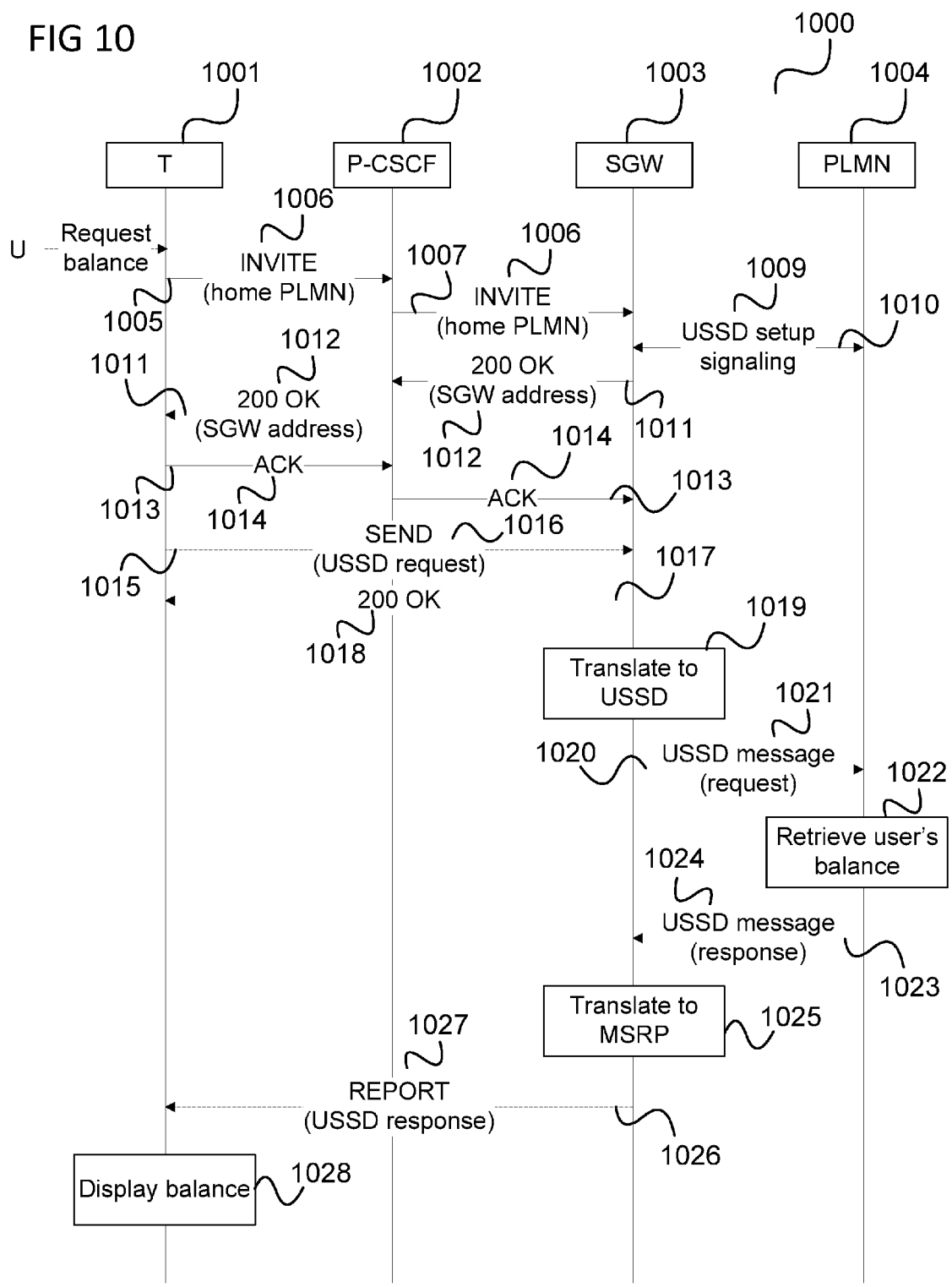

COMMUNICATION DEVICES AND METHODS FOR GENERATING A MESSAGE

TECHNICAL FIELD

Embodiments generally relate to communication devices and methods for generating a message.

BACKGROUND

Unstructured Supplementary Service Data (USSD) is a protocol that may be used by cellular telephones to communicate with a component of the network side. The efficient transmission of supplementary service data in accordance with USSD is desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 10 shows a flow diagram according to an embodiment.

DESCRIPTION

Figure 1:
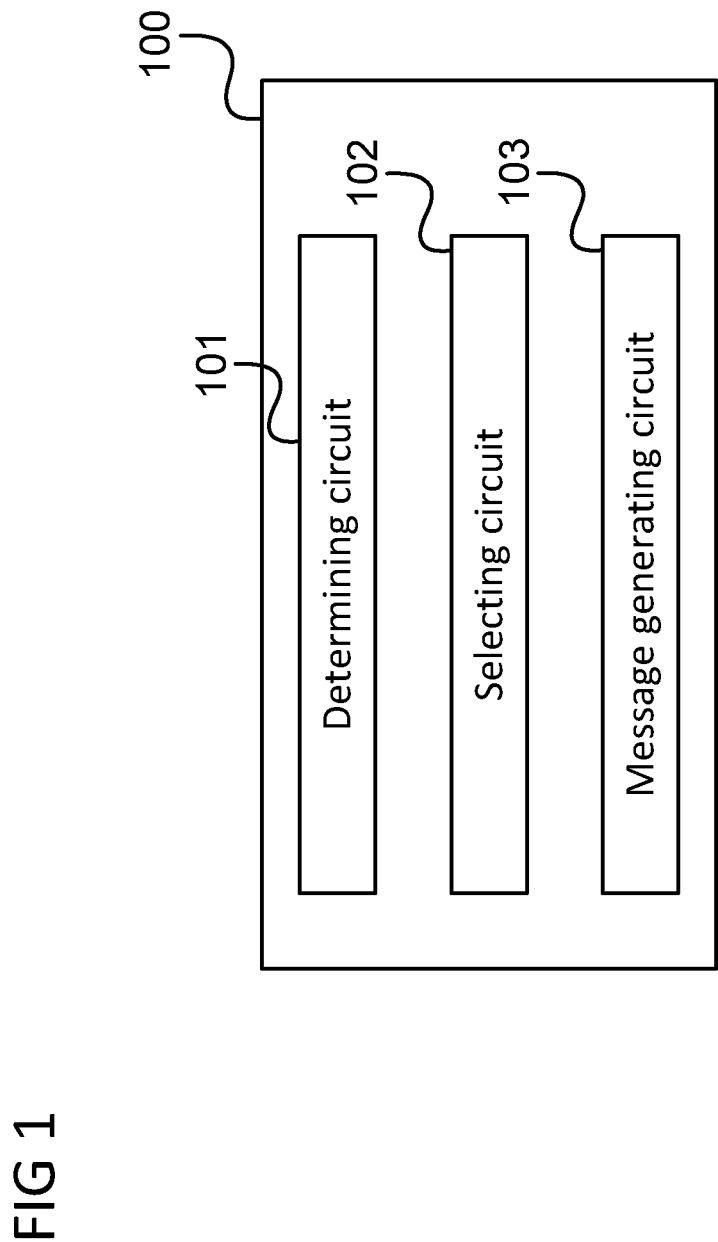
FIG. 1 shows a communication device according to an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Unstructured supplementary service data is a transmission protocol that allows the exchange of data between a communication terminal of a communication system and a component of the network side of the communication system, e.g. a radio access network and/or a core network of a cellular mobile communication system wherein the communication terminal is a subscriber terminal of the cellular mobile communication system.

In USSD Man Machine Interface mode (MMI mode) data may be transmitted that can be used to exchange generic information between a communication terminal and a component of the network side. For example, a communication terminal may transmit data according to USSD to request special information from the component of the network side and the component of the network side may transmit information data to be displayed by the communication terminal.

In USSD application mode data may be transmitted that can be used to exchange application specific information between a communication terminal and a component of the network side. For example, information may be exchanged for controlling a network based voice mail box for the communication terminal.

A USSD message can contain up to 182 7 bit characters.

In a mobile communication system according to 3GPP ($3^{rd}$ Generation Partnership Project) USSD data (i.e. USSD messages) may be transported via layer 3 signaling. According to USSD data are exchanged in (small) dialogs referred to as transactions. Such a dialog is identified by a transaction identifier (id). According to USSD, data are immediately transmitted (without store and forward).

According to one embodiment, a possibility is provided to transport USSD messages in a communication network that is not necessarily based on a 3GPP communication network. For example, according to one embodiment, a transport mechanism is provided that is applicable to an IMS (Internet Protocol Multimedia Subsystem) that is not necessarily provided with a 3GPP communication network. According to one embodiment, a possibility for immediate transport of USSD messages is provided. Further, according to one embodiment, a possibility for efficient transport (e.g. with low signaling overhead) is provided. According to one embodiment, a transport mechanism is provided that is compliant with IETF (Internet Engineering Task Force).

According to one embodiment, information indicated by a USSD message is transported (i.e. transmitted) using MSRP (Message Session Relay Protocol).

In other words, according to one embodiment, USSD is provided based on the MSRP such that USSD messages can be transported in a communication system capable of using the MSRP (e.g. an IMS).

The MSRP can be used to exchange messages within a messaging session, e.g. a multimedia session. Multimedia sessions can for example be set up and controlled using the Session Initiation Protocol (SIP), e.g. in an IMS which provides communication services based on SIP.

MSRP SEND messages can be used to transport messages. An entire message may be split into multiple chunks each being transported by an MSRP SEND message.

MSRP REPORT messages may be used to respond with delay to MSRP SEND messages.

According to one embodiment, a communication system supporting MSRP (but not providing 3GPP layer 3 signaling) can be used to transport USSD messages. Thus, according to one embodiment, supplementary services to be used in a communication system not providing 3GPP layer 3 signaling can be based on USSD and existing USSD based supplementary services can be used in a communication system not providing 3GPP layer 3 signaling. According to one embodiment USSD messages can be immediately transmitted via MSRP and can be transmitted efficiently (e.g. with low signaling overhead). Further, according to one embodiment, USSD message transport via MSRP is compliant with the IETF specifications. According to one embodiment, USSD messages are transported using existing MSRP messages such that no new MSRP messages need to be specified.

Generally, according to one embodiment, a message according to a first transmission protocol (e.g. USSD) may be transmitted by a communication device by means of a message according to a second transmission protocol (e.g. MSRP) in a way that may allow efficient transmission of the message according to the first transmission protocol (or, in other words, the information indicated by the message according to the first transmission protocol). A communication device according to an embodiment is described in the following with reference to FIG. 1.

FIG. 1 shows a communication device 100 according to an embodiment.

The communication device 100 includes a determining circuit 101 configured to determine, for a first message formed in accordance with a first transmission protocol indicating information to be transmitted as part of a message exchange, whether or not the first message is a message directed to an initiator of the message exchange (e.g. a message dialog such as a USSD transaction).

The communication device 100 further includes a selecting circuit 102 configured to select a type of message according to a second transmission protocol based on whether or not the first message is directed to the initiator of the message exchange and a message generating circuit 103 configured to generate a second message of the selected type according to the second transmission protocol indicating the information.

According to one embodiment, in other words, a message according to a first protocol is translated into a message according to a second protocol, wherein the type of message of the second protocol that is used depends on to whom the information indicated by the first message is addressed, namely whether to the initiator of the message exchange in course of which the information is to be transmitted or to a non-initiator of the message exchange in course of which the information is to be transmitted. In other words, different types of messages of the second protocol are used for different transport directions of the information to be exchanged during the message exchange.

It should be noted that the first message does not necessarily need to be present in the communication device 100 (i.e. does not necessarily have to be generated by the communication device 100 or have to have been received by the communication device 100). In other words, the second message may be generated for a content, structure, and/or recipient of the first message that it would have if the first transmission protocol was used for transmission of the information.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The first transmission protocol and/or the second transmission protocols are for example application layer protocols, i.e. protocols of the OSI (Open Systems Interconnection) reference model application layer.

According to one embodiment, the communication device further includes a transmitter configured to send the generated second message.

According to one embodiment, the determining circuit is configured to determine whether the first message is directed to the initiator or to a non-initiator of the message exchange.

According to one embodiment, the information is included in the first message.

According to one embodiment, the message generating circuit is configured to generate the second message to include the information.

According to one embodiment, the second protocol is the Message Session Relay Protocol (MSRP).

According to one embodiment, the first protocol is the Unstructured Supplementary Service Data (USSD) protocol.

According to one embodiment, the message exchange is an Unstructured Supplementary Service Data transaction.

According to one embodiment, the message exchange is carried out in a communication session (e.g. a communication session set up with SIP).

The message exchange is for example carried out between the communication device and another communication device.

The communication device is for example a communication terminal.

The communication device may also be a communication server on the network side of a communication system. The communication device may operate as a gateway between two communication systems.

Figure 2:
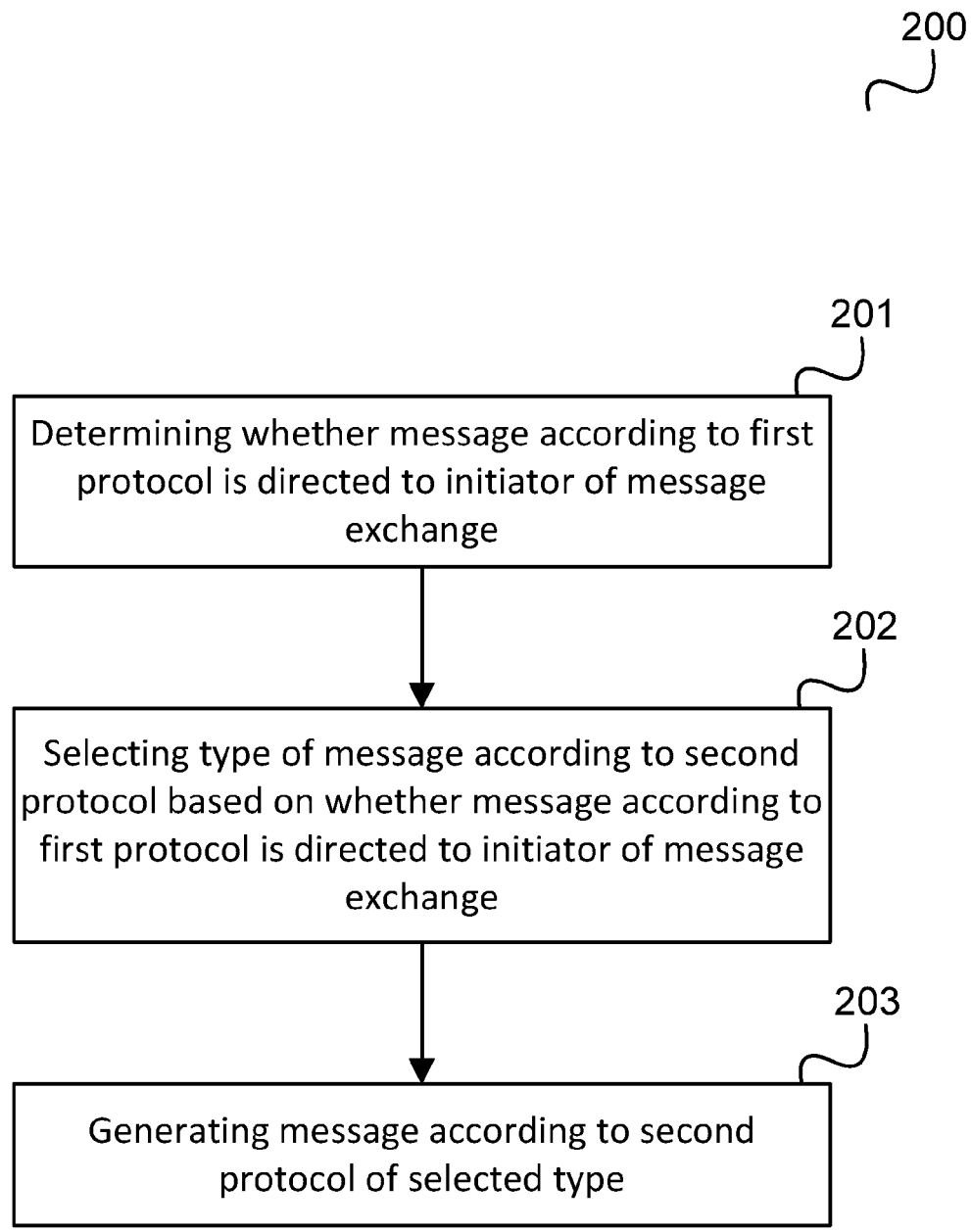
FIG. 2 shows a flow diagram according to an embodiment.

The communication device 100 for example carries out a method as illustrated in FIG. 2.

FIG. 2 shows a flow diagram 200 according to an embodiment.

The flow diagram 200 illustrates a method for generating a message.

In 201 it is determined, for a first message formed in accordance with a first transmission protocol indicating information to be transmitted as part of a message exchange, whether or not the first message is a message directed to an initiator of the message exchange.

In 202 a type of message according to a second transmission protocol is selected based on whether or not the first message is directed to the initiator of the message exchange.

In 203, a second message of the selected type is generated according to the second transmission protocol indicating the information.

In case that the second transmission protocol allows separation of a message in a plurality of parts (which are all associated with the same message by means of an identification of the message), which is also referred to as "chunking", such as it is the case for MSRP, a plurality of messages according to the first protocol are according to one embodiment sent using a plurality of parts of the same message according to the second protocol. This is illustrated in FIG. 3.

Figure 3:
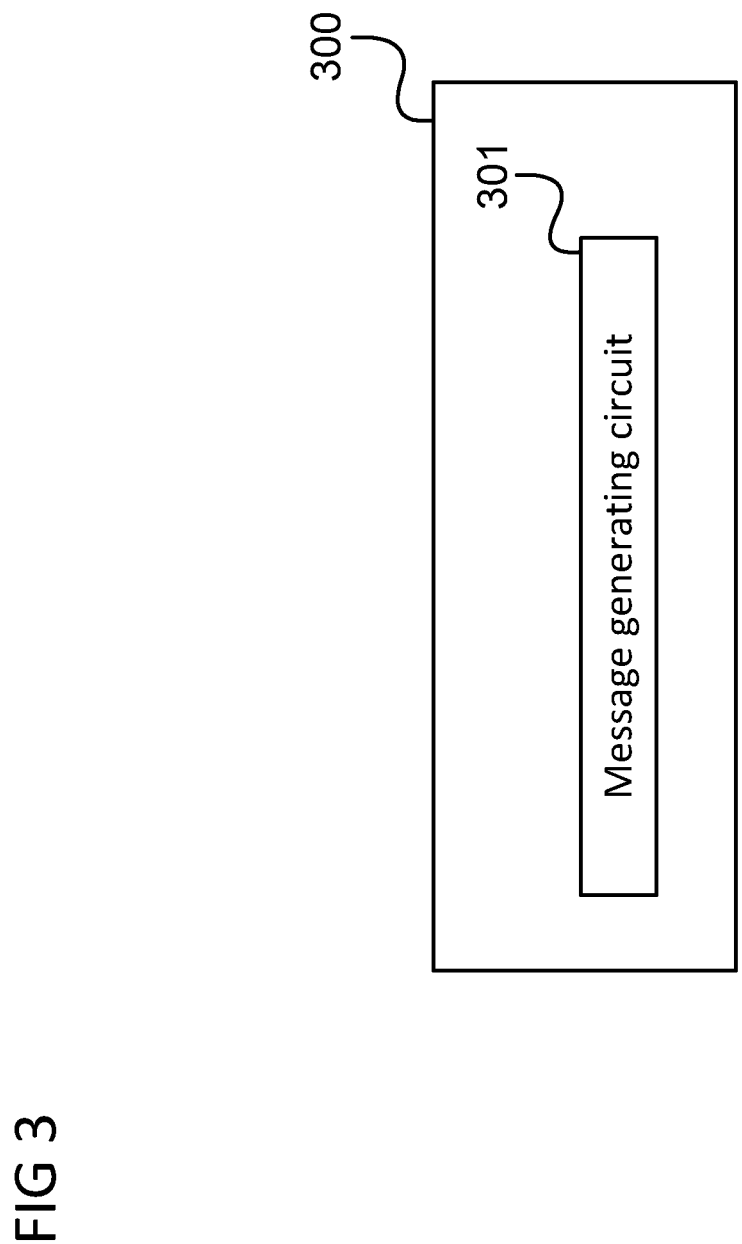
FIG. 3 shows a communication device according to an embodiment.

FIG. 3 shows a communication device 300 according to an embodiment.

The communication device 300 includes a message generating circuit 301 configured to generate, for each first message of a sequence of first messages formed in accordance with a first application layer transmission protocol indicating an information, a part of a second message according to a second application layer transmission protocol indicating the information, wherein the parts of the second message according to the second application layer transmission protocol each include an identification of the second message.

According to one embodiment, in other words, the first messages are translated to parts of the same second message according to the second protocol. These parts are also referred to as "chunks" of the second message. Similarly, response messages to the parts of the second message may be received as parts (chunks) of one (overall) response message. In other words, a dialog between the communication device and another communication device (providing the response messages) may be carried out using only two (overall) messages (namely the second message and the overall response message by the other communication device) which are separated into chunks. This allows carrying out a message dialog according to the second protocol without need of a communication session in which a plurality of messages are sent and received by both sides. The first protocol and the second protocol are in this embodiments application layer protocols, i.e. protocols of the application layer according to the OSI (Open Systems Interconnection) reference model. The chunks include a common identification, namely an identification of the second message, which may in case that the first protocol is USSD for example correspond to a USSD transaction id.

According to one embodiment, the communication device further includes a transmitter configured to transmit the parts of the second message.

The transmitter is for example configured to transmit the parts of the second message in a communication session.

According to one embodiment, the communication device further includes a receiver configured to receive a response message to at least one part of the second message.

According to one embodiment, the message generating circuit is configured to generate the parts of the second message such that a sequence of parts of the second message corresponding to the sequence of first messages is generated and is configured to generate, for the at least one part of the second message, the part of the second message only after the response message to the part of the second message preceding the part of the second message in the sequence of parts of the second message has been received by the receiver.

According to one embodiment, the message generating circuit is configured to, for the at least one part of the second message, generate the part of the second message in response to the response message.

The communication device may further include a receiver configured to receive a response message to each part of the second message.

According to one embodiment, the message generating circuit is configured to generate the parts of the second message such that a sequence of parts of the second message corresponding to the sequence of first messages is generated and is configured to generate, for each part of the second message but the first part in the sequence of parts of the second message, the part of the second message only after the response message to the part of the second message preceding the part of the second message in the sequence of parts of the second message has been received by the receiver.

Figure 4:
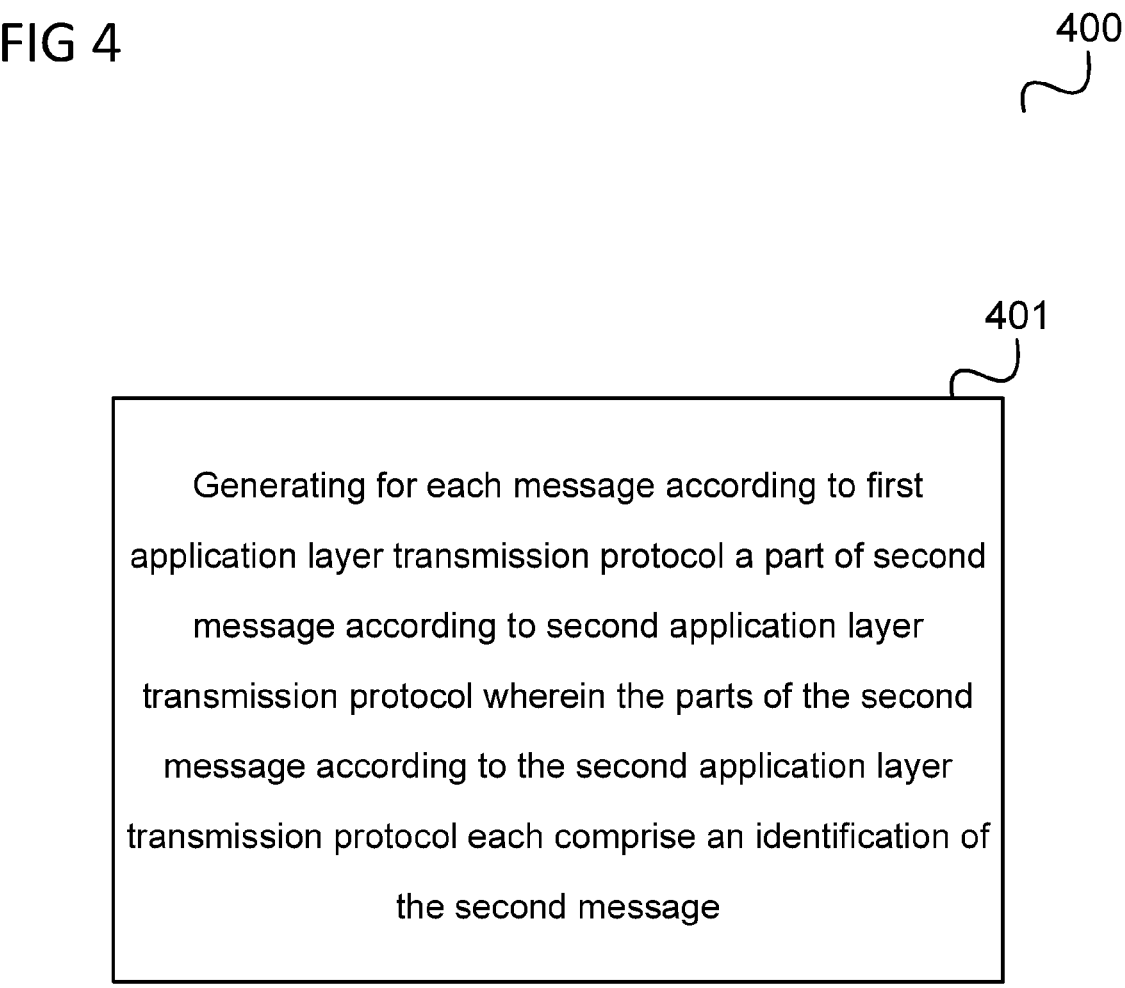
FIG. 4 shows a flow diagram according to an embodiment.

The communication device for example carries out a method as illustrated in FIG. 4.

FIG. 4 shows a flow diagram 400 according to an embodiment.

The flow diagram 400 illustrates a method for generating a message.

In 401, for each first message of a sequence of first messages formed in accordance with a first application layer transmission protocol indicating an information, a part of a second message according to a second application layer transmission protocol is generated indicating the information, wherein the parts of the second message according to the second application layer transmission protocol each include an identification of the second message.

It should be noted that embodiments described in context of one of the communication devices are analogously valid for the other communication device and the methods for generating a message and vice versa.

Further, it should be noted that the communication devices and methods for generating a message as described above with reference to FIGS. 1 to 4 can be used independently and may also be combined according to various embodiments.

According to one embodiment, the first transmission protocol is USSD and/or the second transmission protocol is MSRP. Thus, according to one embodiment, MSRP messages are used for transporting USSD data (i.e. USSD messages) in a communication system. For this, according to one embodiment, an MSRP session is being set up for USSD communication. A USSD transaction is translated to the chunks of a message to be transmitted by MSRP SEND messages (e.g. for the USSD messages generated by the initator of the message dialog) and MSRP REPORT messages (e.g. for the USSD response messages to be returned to the initiator of the message dialog). The USSD transaction identifier (id) is for example mapped to the MSRP Message-ID header value. A component of the network side may provide its MSRP address for the USSD service during session setup. A communication terminal may according to one embodiment choose a target network address depending on the USSD codes for network indication.

According to one embodiment, for interworking of a communication system supporting MSRP with a communication system that does not support MSRP (but supports USSD by other means) a gateway may be provided translating between USSD messages and MSRP messages. In other words, the communication devices according to FIGS. 1 and 3 may be operated as such a gateway.

According to one embodiment, for interworking with USSD based applications an IM client (e.g. running on a communication terminal) and/or an IMS server can be provided for translating between USSD messages and MSRP messages. In other words, the communication devices according to FIGS. 1 and 3 may be operated as an IMS client or as an IMS server.

According to one embodiment, USSD REGISTER messages may be translated to MSRP SEND messages. USSD FACILITY messages may be translated to MSRP SEND or MSRP REPORT messages. USSD RELEASE COMPLETE messages may be translated to MSRP SEND or MSRP REPORT messages. USSD response messages may be translated to MSRP SEND messages or MSRP REPORT messages or MSRP response messages.

In the following, examples are given for transporting USSD message information by means of MSRP.

Figure 5:
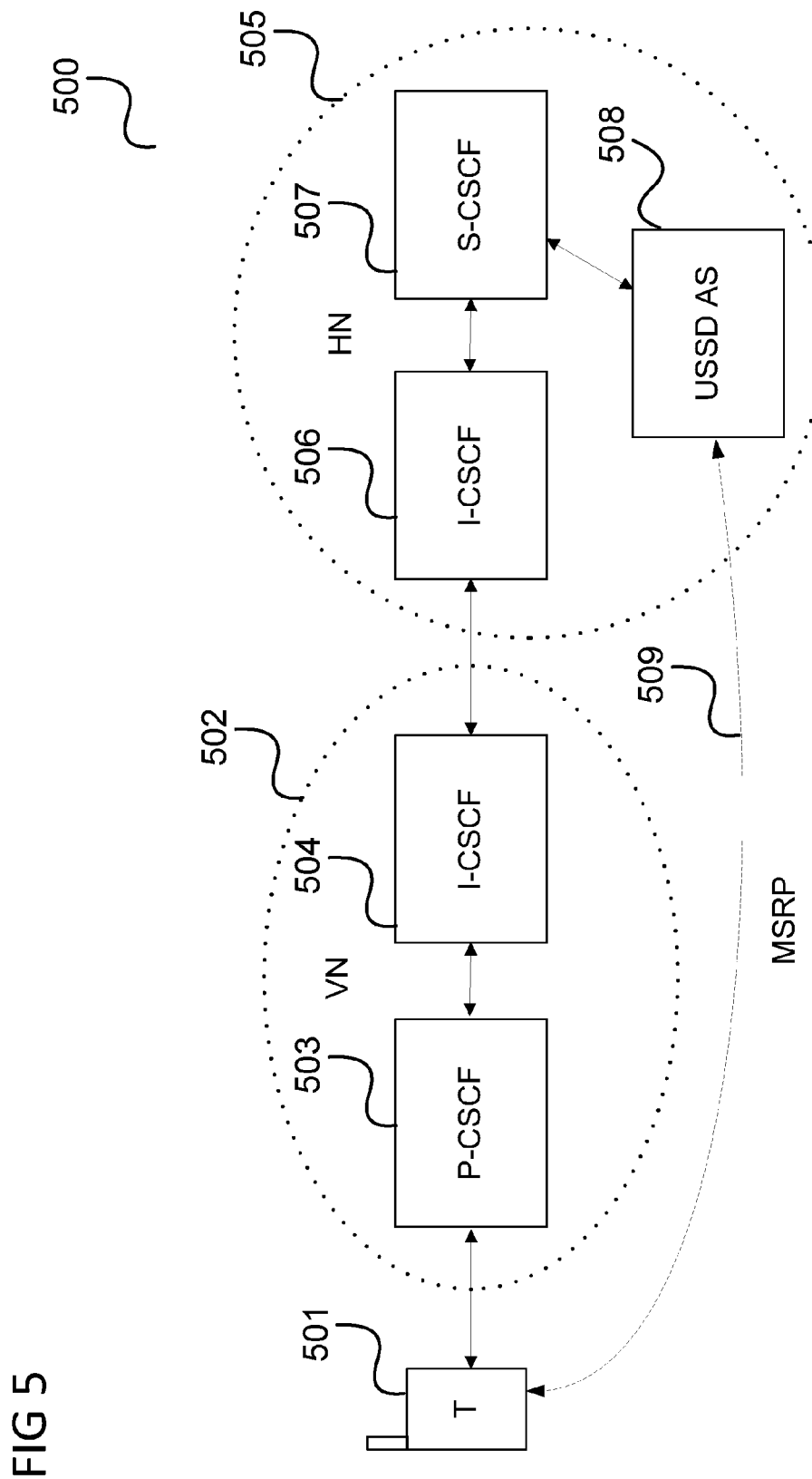
FIG. 5 shows a communication system according to an embodiment.

FIG. 5 shows a communication system 500 according to an embodiment.

The communication system 500 is an IMS communication system, i.e. a communication system based on IMS. It includes a communication terminal 501, in other words an end device, for example a mobile terminal, and a visited (IMS) network 502, i.e. an IMS network which is not operated by the operator of the home network of the communication terminal 501. The visited network 502 includes a P-CSCF (Proxy-Call Session Control Function 503) and a first I-CSCF 504 (Interrogating-CSCF).

The communication system 500 further includes a home (IMS) network 505 of the communication terminal 501 which includes a second I-CSCF 506, an S-CSCF (Serving-CSCF) 507 and a USSD AS (USSD Application Server) 508.

The communication terminal 501 is connected to the visited network's Proxy-CSCF (P-CSCF) 503. The P-CSCF 503 is connected to the home operator's Serving CSCF (S-CSCF) 507 via the first I-CSCF 504 and the second I-CSCF 506. The S-CSCF 507 is connected to the home operator's USSD application server 508.

In the following example, it is assumed that the user of the communication terminal 501 would like to enable call forwarding for his communication terminal 501.

The user initiates the generation and sending of a USSD message using the communication terminal 501 to request call forwarding. The generated USSD message includes particular USSD codes indicating that the USSD message should be sent to the user's home network and indicating that call forwarding is requested.

The communication terminal 501 further initiates an MSRP session. The corresponding flow is illustrated in FIG. 6.

Figure 6:
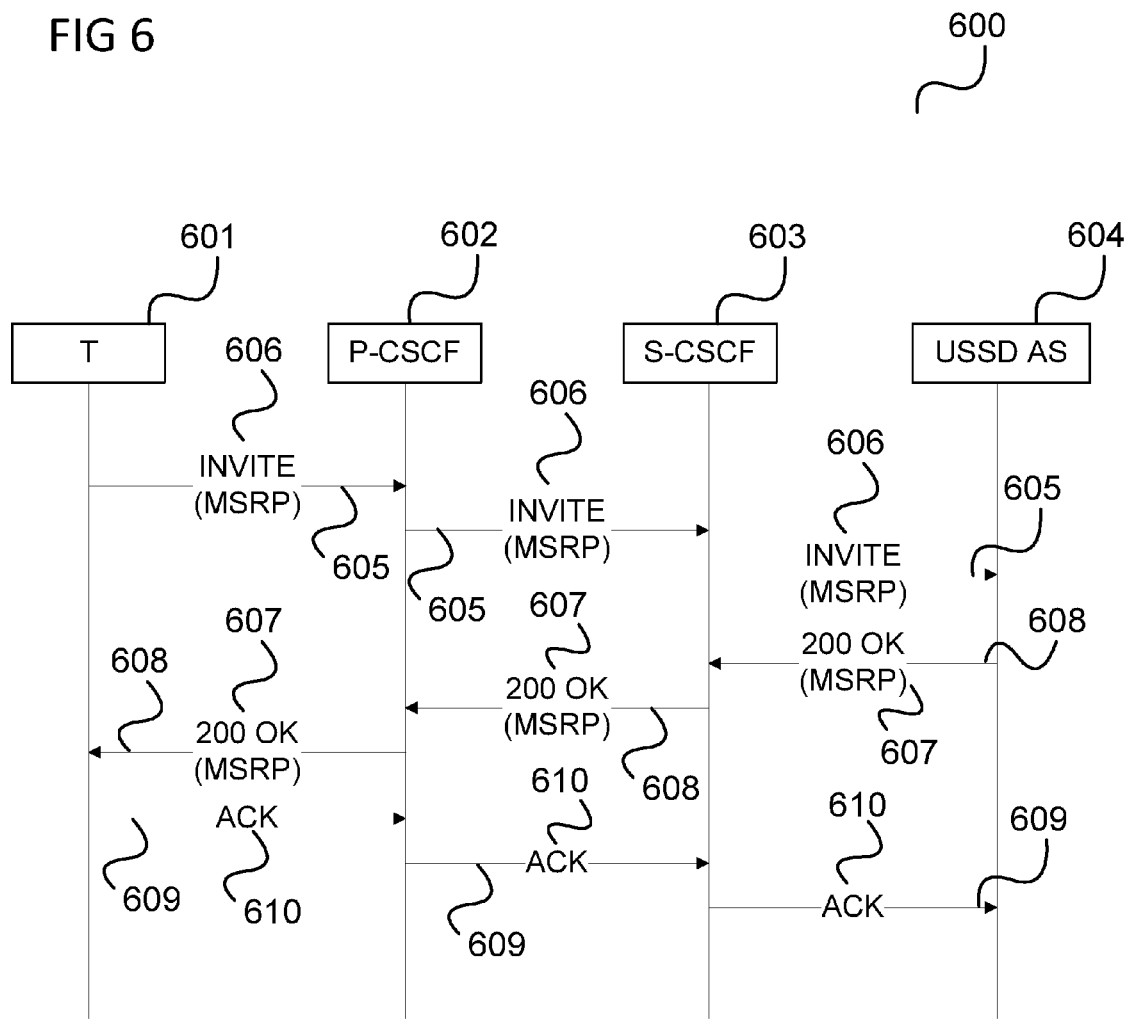
FIG. 6 shows a flow diagram according to an embodiment.

FIG. 6 shows a flow diagram 600 according to an embodiment.

The flow takes place between a communication terminal 601 corresponding to the communication terminal 501, a P-CSCF 602 corresponding to the P-CSCF 503, an S-CSCF 603 corresponding to the S-CSCF 507, and a USSD AS 604 corresponding to the USSD AS 508.

In 605, the communication terminal 601 generates a SIP INVITE message 606 for initiating an MSRP session. Since the USSD message includes the USSD code for home network forwarding the communication terminal 601 chooses the address of the home operator's USSD application server (AS) 604 as target address for the SIP INVITE message 606. The address of the home operator's USSD AS 604 has for example been provided beforehand to the communication terminal 601 by the home network operator.

The SIP INVITE message 606 for example has the following structure:

```
INVITE sip:ussd@operator.com SIP/2.0
    To: <sip:ussd@operator.com>
    From: <sip:user@example.com>;tag=xfg9
    Call-ID: 3413an89KU
    Content-Type: application/sdp
    c=IN IP4 ims.operator.com
    m=message 7654 TCP/MSRP *
    a=accept-types:text/plain
    a=path:msrp://ussd.operator.com:7777/iau39soe2843z;tcp
```

The communication terminal 601 sends the SIP INVITE message 606 via the P-CSCF 602 and the S-CSCF 603 to the USSD AS 604. The USSD AS 604 acknowledges the session setup in 608 by means of an 200 OK message 607 which is in turn acknowledged by the communication terminal 601 by means of an ACK message 610 in 609.

Figure 7:
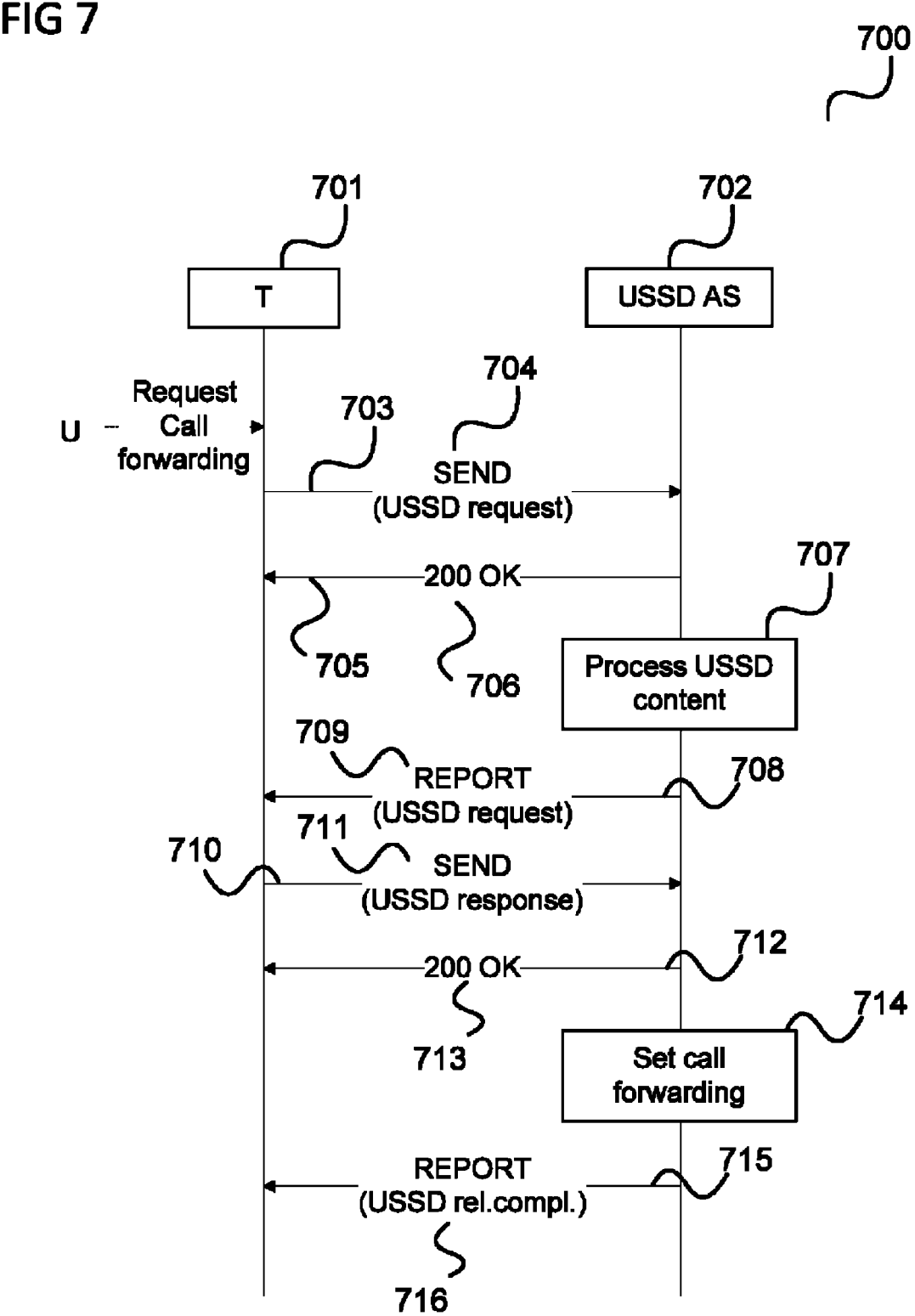
FIG. 7 shows a flow diagram according to an embodiment.

The further message flow after session setup is illustrated in FIG. 7.

FIG. 7 shows a flow diagram 700 according to an embodiment.

The message flow takes place between a communication terminal 701 corresponding to the communication terminal 501, 601 and a USSD AS 702 corresponding to the USSD AS 508, 604.

After session setup, in 703, the communication terminal 701 translates the USSD message into a first MSRP SEND message 704. The first MSRP SEND message 704 includes the USSD transaction identifier (id) as a Message-ID header value. It also includes a 'text/plain' Content-Type body including the USSD data. The Byte-Range header field is set to 1-*/* to indicate that the first MSRP SEND message 704 provides the first of several message chunks and the total message size is unknown. The Success-Report header field is set to 'yes' to indicate that MSRP success REPORT messages should be sent back.

The USSD message and the first MSRP SEND message 704 (into which the USSD message is translated) for example have the following structure:

| USSD message: | |
|---|---|
| Transaction identifier: | 1234 |
| Message type: | Register |
| Facility: | Invoke = ProcessUnstructuredSS-Request, ussd-String = *12(5)#SEND |

| MSRP message: |
|---|
| MSRP dkei38sd SEND |
| To-Path: msrp://ussd.operator.com:7777/iau39soe2843z;tcp |
| From-Path: msrp://user.example.com:8888/9di4eae923wzd;tcp |
| Message-ID: 1234 |
| Success-Report: yes |
| Byte-Range: 1-*/* |
| Content-Type: text/plain |
| MessageType:Register |
| Facility:Invoke = ProcessUnstructuredSS-Request, ussd-String = *12(5)#SEND |
| -------dkei38sd+ |

Further, the communication terminal 701 sets up a Transmission Control Protocol (TCP) connection to the USSD AS 702 for transporting MSRP messages and associates the connection with the USSD MSRP session. This TCP connection for MSRP transport is indicated by a dashed arrow 509 in FIG. 5. The communication terminal 701 sends the first MSRP SEND message 704 via the established TCP connection to the USSD AS 702 in 703.

In 705, when the USSD AS 702 receives the first MSRP SEND message 704 it responds by means of a first MSRP 200 OK message 706 to acknowledge the receipt of the MSRP SEND message 704.

In 707, the USSD AS 702 inspects the content of the first MSRP SEND message 704 for USSD codes. It finds the USSD service code for call forwarding.

The USSD AS 702 further finds that no destination for call forwarding has been defined yet by the user. Therefore it generates a USSD message to request the call forwarding destination from the communication terminal 701. The USSD AS 702 translates the USSD message to a first MSRP REPORT message 709 and sends the first MSRP REPORT message 709 to the communication terminal 701 in 708.

The USSD message and the corresponding first MSRP REPORT message 709 for example have the following structure:

| USSD message: | |
|---|---|
| Transaction identifier: | 1234 |
| Message type: | Facility |
| Facility: | Invoke = UnstructuredSS-Request, ussd-String = *13(7)#SEND |

| MSRP message: |
|---|
| MSRP dkei38ia REPORT |
| To-Path: msrp://user.example.com:8888/9di4eae923wzd;tcp |
| From-Path: msrp://ussd.operator.com:7777/iau39soe2843z;tcp |
| Message-ID: 1234 |
| Byte-Range: 1-88/88 |
| Status: 000 200 OK |
| Content-Type: text/plain |
| MessageType:Facility |

```
Facility:Invoke = UnstructuredSS-Request, ussd-String =
  *13(7)#SEND
  -------dkei38ia$
```

When receiving the first MSRP REPORT message 709 the communication terminal 701 knows from the connection association of the first MSRP REPORT message 709 with the USSD MSRP session that the first MSRP REPORT message 709 is for transporting USSD data. From the USSD transaction identifier in the Message-ID header of the first MSRP REPORT message 709 the communication terminal 701 knows that the transported USSD data belongs to the transaction initiated by the USSD call forwarding request previously sent (with the first MSRP SEND message 704).

In 710, the communication terminal 701 inspects the content of the first MSRP REPORT message 709 for USSD codes. It finds the code for requesting the call forwarding destination and sends back a second MSRP SEND message 711 including a USSD body containing a USSD code for call forwarding destination and the destination URL.

The second MSRP SEND message 711 provides the second chunk of the entire message sent via MSRP whose first chunk has been sent in the first MSRP SEND message 704. This is indicated by a Byte-Range header field value '89-*/*'.

The USSD message corresponding to the USSD body of the second MSRP SEND message 711 and the second MSRP SEND message 711 for example have the following structure:

```
USSD message:

Transaction identifier:  1234
Message type:            Facility
Facility:                Return result = UnstructuredSS-
                         Request, ussd-String =
                         *17(9)*tel:+1-201-555-0123#SEND MSRP message:

MSRP dkei38sd SEND
To-Path: msrp://ussd.operator.com:7777/iau39soe2843z;tcp
From-Path: msrp://user.example.com:8888/9di4eae923wzd;tcp
Message-ID: 1234
Success-Report: yes
Byte-Range: 89-*/*
Content-Type: text/plain
MessageType:Facility
Facility:Return result = UnstructuredSS-Request, ussd-String =
  *17(9)*tel:+1-201-555-0123#SEND
-------dkei38sd+
```

In 712, the USSD AS 702 acknowledges the information about the forwarding destination by means of a second 200 OK message 713.

In 714, the USSD AS 702 sets the call forwarding destination for the user to the URL provided by the second MSRP SEND message 711 and enables call forwarding.

After the transaction has been completed the USSD AS 702 releases the transaction by generating a USSD RELEASE COMPLETE message, translating the message to a second MSRP REPORT message 716 and sending the second MSRP REPORT message to the communication terminal 701 in 715.

The USSD RELEASE COMPLETE message and the second MSRP REPORT message 716 for example have the following structure:

```
USSD message:

Transaction identifier:  1234
Message type:            Release Complete
Facility:                Return result =
                         ProcessUnstructuredSS-Request,
                         ussd-String =

MSRP message:

MSRP dkei38bv REPORT
To-Path: msrp://user.example.com:8888/9di4eae923wzd;tcp
From-Path: msrp://ussd.operator.com:7777/iau39soe2843z;tcp
Message-ID: 1234
Byte-Range: 89-*/*
Status: 000 200 OK
Content-Type: text/plain
MessageType:Release Complete
Facility:Return result = ProcessUnstructuredSS-Request, ussd-
String =
-------dkei38bv$
```

In one embodiment, the MSRP REPORT message 716 does not contain any body. In this case the start line of the MSRP REPORT message 716 may include a comment describing the USSD Release Complete like e.g. 'USSD Release Complete'.

According to another embodiment, other USSD messages than the ones used in the flow illustrated in FIG. 7 may be exchanged. For example, the USSD messages given in the left column of table 1 may be used. For each USSD message a corresponding MSRP message into which the USSD message may be translated according to one embodiment is given in the right hand column of table 1.

TABLE 1

| USSD message | MSRP message |
| --- | --- |
| Facility (Invoke) | SEND |
| Facility (Return result) | REPORT or response if sent by non-initiator; or SEND if sent by initiator |
| Facility (Return error) | REPORT or response if sent by non-initiator; or SEND if sent by initiator |
| Facility (Reject) | REPORT or response if sent by non-initiator; or SEND if sent by initiator |
| RELEASE COMPLETE | REPORT if sent by non-initiator; or SEND if sent by initiator |

According to table 1, USSD error and rejection responses may be translated to MSRP REPORT messages or SEND messages. Such an error response is for example sent if in 707, after the checking the USSD content of the first MSRP SEND message 704 an error occurs, e.g. in case call forwarding is not possible or, in case that instead of call forwarding retrieval of the user's current balance (e.g. prepaid account balance) is requested, if the retrieval of the user's balance fails. In this case, the USSD AS 702 may for example respond with a REPORT message indicating that an error has occurred.

The example described above with reference to FIGS. 6 and 7 may be seen as an example for an end device initiated USSD transaction via IMS.

In the following, a further example is given which is based on the communication system 500 illustrated in FIG. 5.

In this example, it is assumed that the network provider of the user of the communication terminal 501, i.e. the operator of the home network 505 of the user, would like to know the amount of free memory still available on the user's SIM (Subscriber Identity Module) card installed in the communication device 501.

Figure 8:
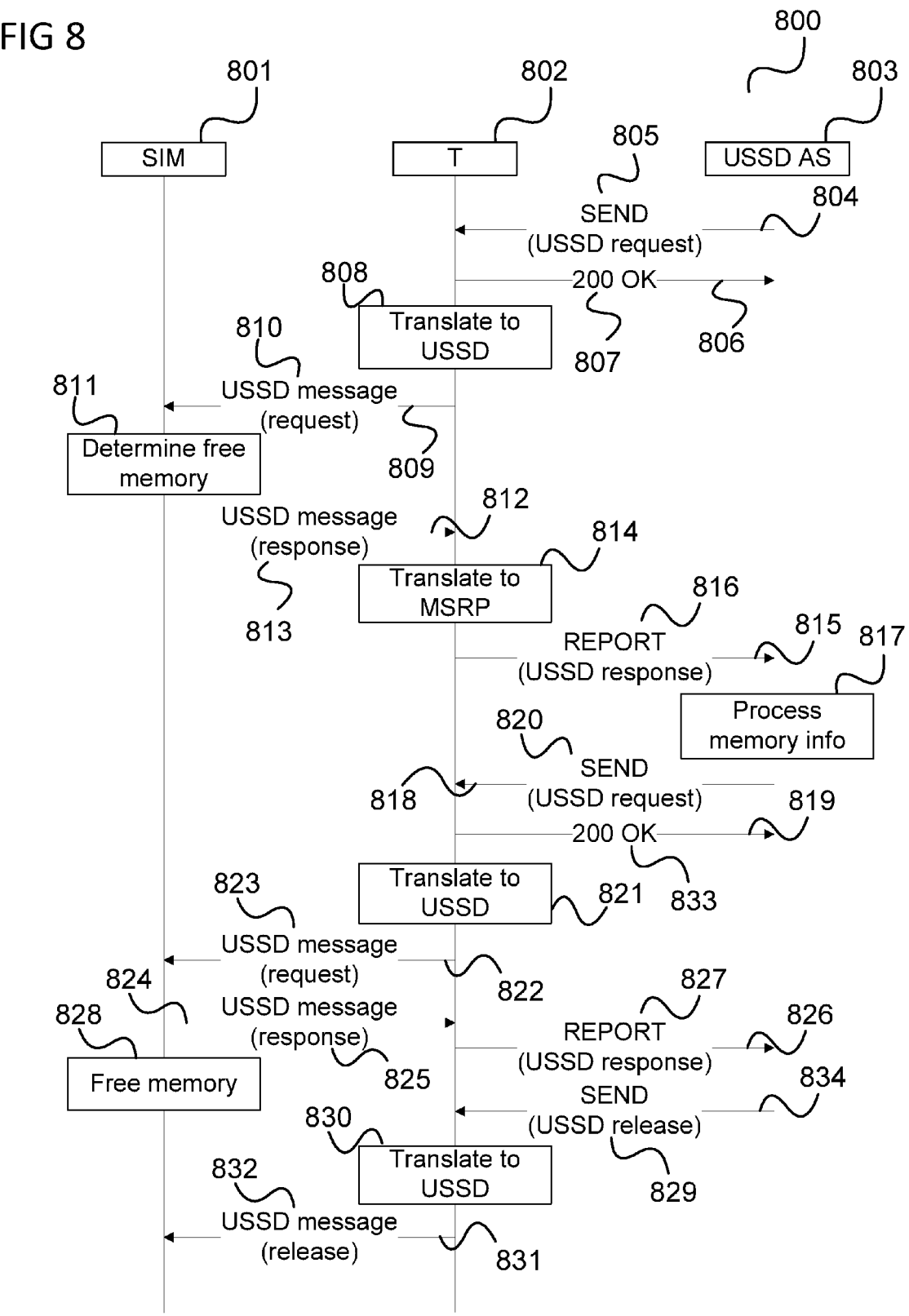
FIG. 8 shows a flow diagram according to an embodiment.

The corresponding message flow is illustrated in FIG. 8.

FIG. 8 shows a flow diagram 800 according to an embodiment.

The flow takes place between a SIM card 801, a communication terminal 802 (in which the SIM card 801 is installed) corresponding to the communication terminal 501, and a USSD AS 803 corresponding to the USSD AS 508.

Analogously as described with reference to FIG. 6, it is assumed that the USSD AS 803 has initiated an MSRP session by sending a SIP INVITE message to the communication terminal 802.

After session setup, in 804, the network provider's USSD application server 803 generates a USSD message directed to the communication terminal 802 for querying the free memory amount of the SIM card 801. The USSD message includes particular USSD codes indicating that the USSD message should be sent to the user's SIM card 801 and indicating that the amount of free SIM card memory is requested.

The USSD AS 803 translates the USSD message into a first MSRP SEND message 805. The first MSRP SEND message 805 includes the USSD transaction identifier (id) as a Message-ID header value. It also includes a 'text/plain' Content-Type body including the USSD data. The Byte-Range header field is set to 1-*/* to indicate that the first MSRP SEND message 805 provides the first of several message chunks and the total message size is unknown. The Success-Report header field is set to 'yes' to indicate that MSRP success REPORT messages should be sent back.

The USSD message and the corresponding first MSRP SEND message 805 for example have the following structure:

| USSD message: | |
|---|---|
| Transaction identifier: | 1234 |
| Message type: | Register |
| Facility: | Invoke = ProcessUnstructuredSS-Request, ussd-String = *13(6)#SEND |

| MSRP message: |
|---|
| MSRP dkei38sd SEND |
| To-Path: msrp://user.example.com:8888/9di4eae923wzd;tcp |
| From-Path: msrp://ussd.operator.com:7777/iau39soe2843z;tcp |
| Message-ID: 1234 |
| Success-Report: yes |
| Byte-Range: 1-*/* |
| Content-Type: text/plain |
| MessageType:Register |
| Facility:Invoke = ProcessUnstructuredSS-Request, ussd-String = *13(6)#SEND |
| -------dkei38sd+ |

The USSD AS 803 sets up a Transmission Control Protocol (TCP) connection to the communication terminal 802 for transporting MSRP messages and associates the connection with the USSD MSRP session. Then the USSD AS sends the first MSRP SEND message 805 via the established TCP connection to the communication terminal 802.

When the communication terminal receives the first MSRP SEND message 805 it responds in 806 by means of an MSRP 200 OK message 807 to acknowledge the receipt of the first MSRP SEND message 805 and inspects the content of the first MSRP SEND message 805 for USSD codes. It finds the USSD code for SIM forwarding. Therefore, in 808, the communication terminal 802 translates the first MSRP SEND message 805 into a first USSD message 810 and forwards the first USSD message 810 to the SIM 801 in 809.

The SIM 801 inspects the content of the first USSD message 810 for USSD codes in 811. It finds the USSD service code for free memory amount querying and in 812 sends back a second USSD message 813 including the free amount of memory. The second USSD message 813 also includes a USSD code indicating that the second USSD message 813 should be forwarded to the user's home network.

In 814, when receiving the second USSD message 813 from the SIM 801, the communication terminal 802 translates it to a first MSRP REPORT message 816 and sends the first MSRP REPORT message 816 to the USSD AS 803 in 815.

In 817, when receiving the first MSRP REPORT message 816 the USSD AS 803 knows from the USSD transaction identifier in the Message-ID header of the first MSRP REPORT message 816 that the transported USSD data belongs to the transaction initiated by the USSD memory query previously sent (by means of the first SEND message 805).

In this example it is assumed that the USSD AS 803 extracts the free memory amount information from the first MSRP REPORT message 816 and finds that the free memory amount is too low. Therefore the USSD AS 803 generates another USSD message to request the user's SIM card 801 to free unneeded memory. The USSD AS 803 translates this USSD message to a corresponding second MSRP SEND message 820. The second MSRP SEND message 820 includes the same USSD transaction id as the first MSRP SEND message 805 in the Message-ID header to indicate that the included USSD message belongs to the same USSD transaction. In 818, the USSD AS 803 sends the second MSRP SEND message 820 to the communication terminal 802 via the TCP connection associated with the MSRP session.

The communication terminal 802 acknowledges receipt of the second MSRP SEND message 820 in 819 by means of a second 200 OK message 833.

In 821, the communication terminal 802 translates the second MSRP SEND message 818 to a third USSD message 823 and sends the third USSD message 823 to the SIM 801 in 822.

In 824, the SIM 801 acknowledges receipt of the instruction to free memory by means of a fourth USSD message 825 which is translated by the communication terminal 802 to a second REPORT message 827 which is sent to the USSD AS 803 in 826.

In 828, according to the USSD code for freeing memory in the third USSD message 823 the SIM 801 frees unneeded memory.

After the transaction has been completed the USSD AS 803 releases the transaction by generating a USSD RELEASE COMPLETE message (or USSD release message). The USSD AS 803 translates the USSD RELEASE COMPLETE message into a third MSRP SEND message 829 and sends it to the communication terminal 802 in 834.

The USSD release message and the third MSRP SEND message 829 for example have the following structure:

| USSD message: | |
|---|---|
| Transaction identifier: | 1234 |
| Message type: | Release Complete |
| Facility: | Return result = ProcessUnstructuredSS-Request, ussd-String = |

-continued

```
MSRP message:

MSRP dkei38sd SEND
To-Path: msrp://user.example.com:8888/9di4eae923wzd;tcp
From-Path: msrp://ussd.operator.com:7777/iau39soe2843z;tcp
Message-ID: 1234
Success-Report: yes
Byte-Range: 89-144/144
Content-Type: text/plain
MessageType:Release Complete
Facility:Return result = ProcessUnstructuredSS-Request, ussd-
String =
-------dkei38sd$
```

In 830, the communication terminal translates the third MSRP SEND message 829 into a fifth USSD message 832 which it sends to the SIM 801 in 831.

The example described with reference to FIG. 8 can be seen as an example for an USSD transaction via IMS initiated by the network side (in this case the USSD AS 803).

A further example is described in the following. For this example, a communication system based on IMS as illustrated in FIG. 9 is assumed.

Figure 9:
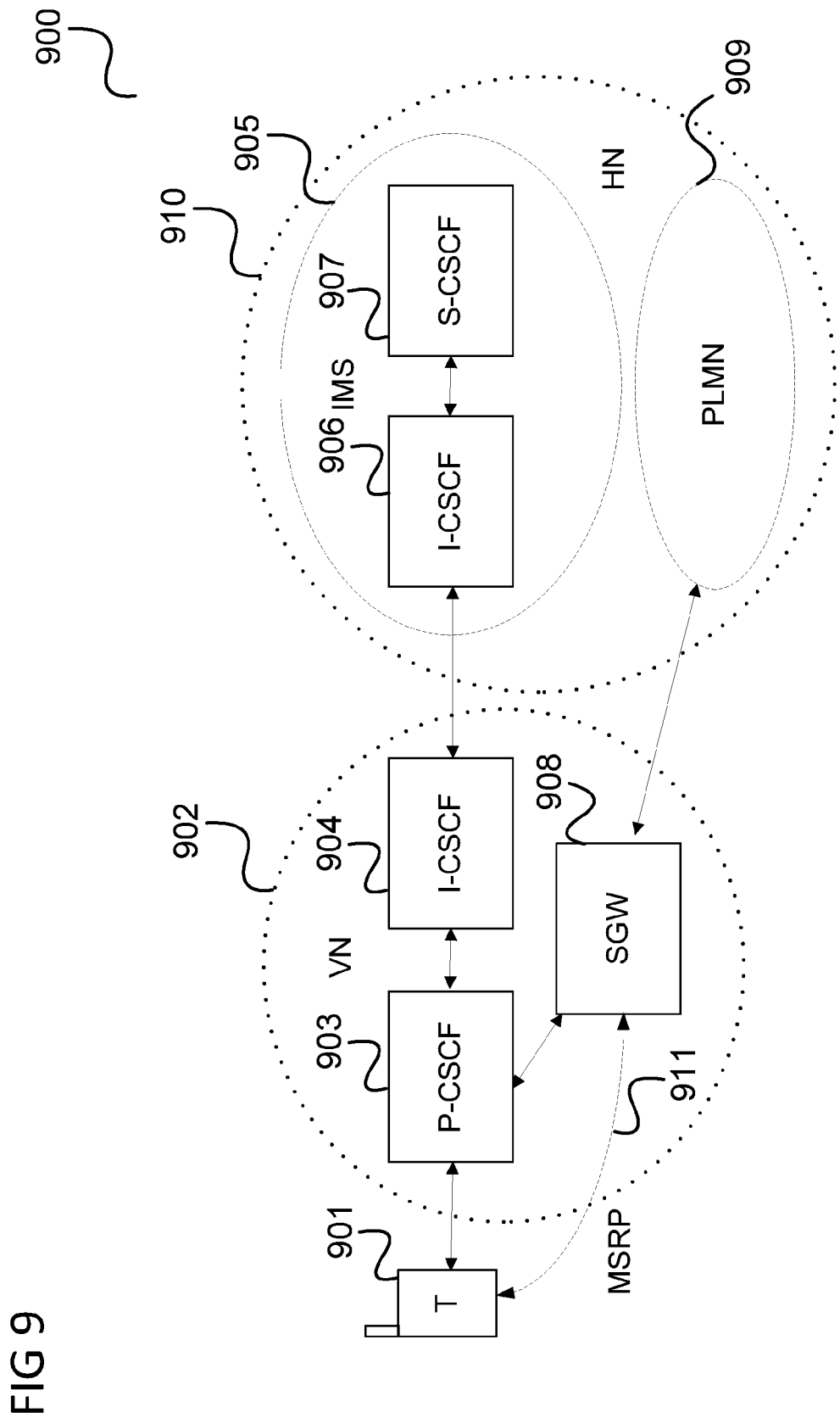
FIG. 9 shows a communication system according to an embodiment.

FIG. 9 shows a communication system 900 according to an embodiment.

The communication system 900 is an IMS communication system, i.e. a communication system based on IMS. It includes a communication terminal 901, in other words an end device, for example a mobile terminal, and a visited (IMS) network 902, i.e. an IMS network which is not operated by the operator of the home network of the communication terminal 901. The visited network 902 includes a P-CSCF (Proxy-Call Session Control Function 903), a first I-CSCF 904 (Interrogating-CSCF) and a signaling gateway (SGW) 908.

The communication system 900 further includes a home IMS network 905 of the communication terminal 901 which includes a second I-CSCF 906 and an S-CSCF (Serving-CSCF) 907. Further, the communication system 900 includes a PLMN (Public Land Mobile Network) 909. The PLMN 909 may be a home PLMN 909 of the communication terminal 901 such that the home IMS network 905 and the PLMN 909 can be seen to form a home network 910 of the communication terminal 901.

The communication terminal 901 is connected to the visited network's Proxy-CSCF (P-CSCF) 903. The P-CSCF 903 is connected to the home operator's Serving CSCF (S-CSCF) 907 via the first I-CSCF 904 and the second I-CSCF 906.

Unlike in the examples described with reference to FIG. 5, the P-CSCF 903 is also connected to the home operator's PLMN 909 via the Signaling Gateway (SGW) 908. The PLMN 909 includes a USSD server. It should be noted that the SGW 908 may be integrated into the visited P-CSCF or into the USSD server of the PLMN 909.

It is assumed that the user of the communication terminal 901 is using the communication terminal 901 with a prepaid subscription. It is further assumed that he would like to know his subscription's current balance.

The corresponding message flow is illustrated in FIG. 10.

FIG. 10 shows a flow diagram 1000 according to an embodiment.

The flow takes place between a communication terminal 1001 corresponding to the communication terminal 901, a P-CSCF 1002 corresponding to the P-CSCF 903, an SGW 1003 corresponding to the SGW 908, and a PLMN 1004 corresponding to the PLMN 909.

The user initiates the generation of a USSD message by his communication terminal 1001 for querying the balance. The USSD message includes particular USSD codes indicating that the USSD message should be sent to the user's home network 910 and indicating that the current subscription balance is requested.

It is assumed that the home operator's network 910 does not support USSD via IMS. Therefore, it is assumed that the communication device 901 has been provided with the home network operator's PLMN USSD server address for using the USSD service.

In 1005, the communication terminal 1001 generates a SIP INVITE message 1006 targeted at the provided home operator's PLMN USSD server for setting up an MSRP session and sends the message to the P-CSCF 1002.

Since the message is targeted at the home PLMN USSD server the P-CSCF 1002 forwards the message to the SGW 1003 in 1007.

The SGW 1003 translates the SIP INVITE message 1006 to a PLMN USSD signaling 1009 and forwards the signaling information in 1010 to the PLMN 1004, specifically the PLMN USSD server, which may respond accordingly.

In 1011 the SGW 1003 sends back a first SIP 200 OK message 1012 for negotiating the SDP (Session Description Protocol) for the MSRP session. The first SIP 200 OK message 1012 includes the address of the SGW 1003 in the Contact header field. The first SIP 200 OK message 1012 has for example the following structure:

```
SIP/2.0 200 OK
    To: <sip:ussd@operator.com>
    From: <sip:user@example.com>;tag=xfg9
    Call-ID: 3413an89KU
    CSeq: 63104 INVITE
    Contact: <msrp://sgw.operator.com:9999/hgfasd8768754>
    Content-Type: application/sdp
    c=IN IP4 ims.operator.com
    m=message 7654 TCP/MSRP *
    a=accept-types:text/plain
    a=path:msrp://sgw.operator.com:9999/hgfasd8768754;tcp
```

In 1013, the communication terminal 1001 acknowledges receipt of the first SIP 200 OK message 1012 by means of an ACK message 1014. The communication terminal 1001 stores the SGW address included in the first SIP 200 OK message 1012 for later setting up an MSRP TCP connection.

After session setup the communication terminal 1001 translates the USSD message indicating that the current subscription balance is requested and generated by the communication terminal 1001 into a MSRP SEND message 1016. The MSRP SEND message 1016 includes the USSD transaction identifier (id) as a Message-ID header value. It also includes a 'text/plain' Content-Type body including the USSD data. The Byte-Range header field is set to 1-*/* to indicate that the MSRP SEND message 1016 provides the first of several message chunks and the total message size is unknown. The Success-Report header field is set to 'yes' to indicate that MSRP success REPORT messages should be sent back.

In 1015, the communication terminal 1001 sets up a TCP connection to the SGW 1003 for transporting MSRP messages and associates the connection with the USSD MSRP session. The communication terminal 1001 sends the MSRP SEND message 1016 via the established TCP connection to the SGW 1003. The TCP connection for MSRP transport is indicated by a dashed arrow 911 in FIG. 9.

In 1017, when the SGW 1003 receives the MSRP SEND message 1016 it responds by means of a first MSRP 200 OK message 1018 to acknowledge the receipt of the MSRP SEND message 1016.

In 1019, the SGW 1003 translates the MSRP SEND message 1016 to a first USSD message 1021 and in 1020 forwards the USSD message 1021 to the PLMN 1004 (i.e. the home PLMN USSD server).

In 1022, the PLMN 1004 (i.e. the PLMN USSD server) finds the USSD service code for balance querying and responds in 1023 by means of a second USSD message 1024 including the current balance information. The second USSD message 1024 includes a code indicating that the message content should be presented to the user.

The second USSD message 1024 is sent from the PLMN USSD server to the SGW 1003. In 1025, the SGW 1003 translates the received second USSD message 1024 to an MSRP REPORT message 1027 and in 1026 sends it to the communication terminal 1001.

In 1028, when receiving the MSRP REPORT message 1027, the communication terminal 1001 inspects the content of the MSRP REPORT message 1027 for USSD codes. It finds the code for user presentation and displays the USSD message's content (the current balance information) for the user.

In one embodiment, instead of including USSD data in MSRP message bodies with Content-Type 'text/plain' the USSD data may be included with other Content-Types, e.g. with a special USSD Content-Type 'application/ussd'.

According to one embodiment, USSD messages may target the visited network 502, 902 by targeting the SIP INVITE message for setting up the MSRP USSD session at the visited USSD AS (i.e. at a USSD AS of the visited network 502, 902). In case that the communication terminal 501, 901 does not know the visited USSD AS's address then the SIP INVITE message may be targeted at a generic visited USSD AS address like e.g. 'visitedUSSDAS@visitedOperator.com'. In this case the P-CSCF 503, 903 may for example provide the address of the visited operator's USSD AS in the SIP 200 OK message replied to the SIP INVITE message (similar to the provision of the SGW address with the first 200 OK message 1012 in the flow of figure 1000).

Whether the communication terminal should target its USSD messages at the home operator or at the visited operator may be decided by the communication terminal depending on USSD codes for network forwarding included in the USSD messages to be sent. For example, if home network forwarding is indicated then the home operator's USSD AS or PLMN USSD server is targeted and if visited network forwarding is indicated then the visited operator's USSD AS or PLMN USSD server is targeted.

According to one embodiment, instead or in addition of indicating the MSRP address for USSD network service in the Contact header field of a SIP 200 OK message the address may be indicated in the SIP message's body, e.g. in its SDP body, for example as follows:

```
SIP/2.0 200 OK
    To: <sip:ussd@operator.com>
    From: <sip:user@example.com>;tag=xfg9
    Call-ID: 3413an89KU
    CSeq: 63104 INVITE
    Contact: <msrp://sgw.operator.com:9999/hgfasd8768754>
    Content-Type: application/sdp
    c=IN IP4 ims.operator.com
```

-continued

```
m=message 7654 TCP/MSRP *
a=accept-types:text/plain
a=path:msrp://sgw.operator.com:9999/hgfasd8768754;tcp
```

In one embodiment, if an MSRP session has already been set up for home operator targeted USSD but not for visited operator targeted USSD, and if a new USSD transaction is targeted at the visited operator then a new MSRP session may be set up targeting the visited operator and vice versa.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
    a determining circuit configured to determine, for a first message formed in accordance with an Unstructured Supplementary Service Data (USSD) protocol that indicates an information to be transmitted as part of a USSD transaction, whether or not the first message is a message directed to an initiator of the USSD transaction in course of which the information is to be transmitted or to a non-initiator of the USSD transaction in course of which the information is to be transmitted;
    a selecting circuit configured to select a type of message according to a Message Session Relay Protocol (MSRP) based on whether or not the first message is directed to the initiator of the USSD transaction in course of which the information is to be transmitted or to a non-initiator of the USSD transaction in course of which the information is to be transmitted; and
    a message generating circuit configured to generate a second message of the selected type according to the MSRP that indicates the information, wherein the first message is a USSD REGISTER message, a USSD FACILITY message, or a USSD RELEASE COMPLETE message;
    where the second message is an MSRP SEND message that corresponds to the USSD REGISTER message, the USSD FACILITY message, or the USSD RELEASE COMPLETE message, or an MSRP REPORT message that corresponds to the USSD FACILITY message or the USSD RELEASE COMPLETE message.

2. The communication device according to claim 1, further comprising a transmitter configured to send the generated second message.

3. The communication device according to claim 1, wherein the information is included in the first message.

4. The communication device according to claim 1, wherein the message generating circuit is configured to generate the second message to comprise the information.

5. The communication device according to claim 1, wherein the USSD transaction is carried out in a communication session.

6. The communication device according to claim 1, wherein the USSD transaction is carried out between the communication device and another communication device.

7. The communication device according to claim 1, being a communication terminal.

8. The communication device according to claim 1, being a communication server on the network side of a communication system.

9. The communication device according to claim 1, operating as a gateway between two communication systems.

10. A method for generating a message comprising:
   determining, for a first message formed in accordance with an Unstructured Supplementary Service Data (USSD) protocol indicating an information to be transmitted as part of a USSD transaction, whether or not the first message is a message directed to an initiator of the USSD transaction in course of which the information is to be transmitted or to a non-initiator of the USSD transaction in course of which the information is to be transmitted;
   selecting a type of message according to a Message Session Relay Protocol (MSRP) based on whether or not the first message is directed to the initiator of the USSD transaction in course of which the information is to be transmitted or to a non-initiator of the USSD transaction in course of which the information is to be transmitted; and
   generating a second message of the selected type according to the MSRP indicating the information wherein the first message, a USSD FACILITY message, or a USSD RELEASE COMPLETE message;
   wherein the second message is an MSRP SEND message that corresponds to the USSD REGISTER message, the USSD FACILITY message, or the USSD RELEASE COMPLETE message, or an MSRP REPORT message that corresponds to the USSD FACILITY message or the USSD RELEASE COMPLETE message.

11. A communication device comprising:
   a message generating circuit configured to generate, for each first message of a sequence of first messages formed in accordance with an Unstructured Supplementary Service Data (USSD) protocol indicating an information, a part of a second message according to a Message Session Relay Protocol (MSRP) indicating the information, wherein the parts of the second message according to the MSRP each comprise an identification of the second message, wherein the identification of the second message is mapped from an identification of the sequence of first messages;
   wherein a first message in the sequence of first messages is a USSD REGISTER message, a USSD FACILITY message, or a USSD RELEASE COMPLETE message; and
   wherein the second message is an MSRP SEND message that corresponds to the USSD REGISTER message, the USSD FACILITY message, or the USSD RELEASE COMPLETE message, or an MSRP REPORT message that corresponds to the USSD FACILITY message or the USSD RELEASE COMPLETE message.

12. The communication device according to claim 11, further comprising a transmitter configured to transmit the parts of the second message.

13. The communication device according to claim 12, wherein the transmitter is configured to transmit the parts of the second message in a communication session.

14. The communication device according to claim 12, further comprising a receiver configured to receive a response message to al least one part of the second message.

15. The communication device according to claim 14, wherein the message generating circuit is configured to generate the parts of the second message such that a sequence of parts of the second message corresponding to the sequence of first messages is generated and is configured to generate, for the at least one part of the second message, the part of the second message only after the response message to the part of the second message preceding the part of the second message in the sequence of parts of the second message has been received by the receiver.

16. The communication device according to claim 15, wherein the message generating circuit is configured to, for the at least one part of the second message, generate the part of the second message in response to the response message.

17. The communication device according to claim 12, further comprising a receiver configured to receive a response message to each part of the second message.

18. The communication device according to claim 17, wherein the message generating circuit is configured to generate the parts of the second message such that a sequence of parts of the second message corresponding to the sequence of first messages is generated and is configured to generate, for each part of the second message but the first part in the sequence of parts of the second message, the part of the second message only after the response message to the part of the second message preceding the part of the second message in the sequence of parts of the second message has been received by the receiver.

19. A method for generating a message comprising:
   generating, for each first message of a sequence of first messages formed in accordance with an Unstructured Supplementary Service Data (USSD) protocol indicating an information, a part of a second message according to a Message Session Relay Protocol (MSRP) indicating the information, wherein the parts of the second message according to the MSRP comprise an identification of the second message, wherein the identification of the second message is mapped from an identification of the sequence of first messages;
   wherein a first message in the sequence of first messages is a USSD REGISTER message, a USSD FACILITY message, or a USSD RELEASE COMPLETE message; and
   wherein the second message is an MSRP SEND message that corresponds to the USSD REGISTER message, the USSD FACILITY message, or the USSD RELEASE COMPLETE message, or an MSRP REPORT message that corresponds to the USSD FACILITY message or the USSD RELEASE COMPLETE message.

* * * * *

UNITED STATES PATENT AND TRADEMARK OFFICE
CERTIFICATE OF CORRECTION

PATENT NO. : 8,861,509 B2  Page 1 of 1
APPLICATION NO. : 13/169176
DATED : October 14, 2014
INVENTOR(S) : Frank Kowalewski It is certified that error appears in the above-identified patent and that said Letters Patent is hereby corrected as shown below:

In the Claims

Column 17, lines 24-26 (Claim 10):   Replace "the first message, a USSD FACILITY message, or a USSD RELEASE COMPLETE message;" with --the first message is a USSD REGISTER message, a USSD FACILITY message, or a USSD RELEASE COMPLETE message;--.

Column 18, line 42 (Claim 19):   After "MSRP" insert --each--.

Signed and Sealed this
First Day of March, 2016

Michelle K. Lee
*Director of the United States Patent and Trademark Office*